United States Patent [19]

Piepers

[11] Patent Number: 4,813,653
[45] Date of Patent: Mar. 21, 1989

[54] FLUIDIZED BED APPARATUS
[75] Inventor: Jules Piepers, Zwevegem, Belgium
[73] Assignee: N. V. Bekaert S.A., Zwevegem, Belgium
[21] Appl. No.: 11,403
[22] Filed: Feb. 4, 1987

Related U.S. Application Data

[63] Continuation of Ser. No. 787,136, Oct. 15, 1985, abandoned.

[30] Foreign Application Priority Data

Oct. 19, 1984 [GB] United Kingdom ............... 8426455

[51] Int. Cl.$^4$ .................................................. C21D 9/00
[52] U.S. Cl. ..................................... 266/251; 432/58; 266/252
[58] Field of Search ..................... 432/58; 34/57 A; 266/249, 252, 251, 255

[56]  References Cited
U.S. PATENT DOCUMENTS

| 3,511,487 | 6/1968 | Desty | 263/52 |
| 3,615,083 | 10/1971 | Feinman et al. | 266/259 |
| 3,884,617 | 5/1975 | Virr | 431/170 |
| 4,220,445 | 9/1980 | James et al. | 432/250 |
| 4,429,471 | 2/1984 | Goodstine et al. | 34/10 |

FOREIGN PATENT DOCUMENTS

| 3340099 | 4/1985 | Fed. Rep. of Germany . | |
| 2448573 | 10/1980 | France | 266/252 |
| 1567909 | 6/1977 | United Kingdom . | |
| 2020406 | 11/1979 | United Kingdom . | |
| 2073041 | 10/1981 | United Kingdom . | |

OTHER PUBLICATIONS

Staffin et al, Continuous Wire Oil Tempering in a Fluidized Bed Furnace, Conf. Proc. Wire Assoc. Int. 5/1981.
Process Equipment and Systems Division, Procedyne Corp. publication, 1981.
"Fluid Bed Technology", J. Reindl, General Motors Corp. presented to ASM 9/23/81.
Features of Fluid Hearth Atmosphere Furnace System, Procedyne Corp.
Fluid Hearth by Procedyne, "High Temperature Controlled Carbonization of Steel in Fluidized Bed Furnaces", Japha Industrial Hearth, Aug. 1983.

Primary Examiner—Christopher W. Brody
Attorney, Agent, or Firm—Foley & Lardner, Schwartz, Jeffery, Schwaab, Mack, Blumenthal & Evans

[57] ABSTRACT

Fluidized bed apparatus 1 for use in heat treating metal articles in a bed of fluidized particles 6 includes a heat insulated structure 2 and a removable module 4. The module is a metallic assembly integrating a vessel 5 for receiving the fluidizable particles, a bottom plate 8 of the vessel having a plurality of gas inlet nozzles 9, and a gas plenum chamber 11 fed by a gas admission conduit comprising a gas duct 12 and an entry pipe 13. Each nozzle 9 comprises a vertical inlet pipe 25 and a distinct cap 26 of specific channel design mounted on top of the pipe for deflecting a fluidizing gas flow into the particle bed 6.

10 Claims, 4 Drawing Sheets

FLUIDIZED BED APPARATUS

This application is a continuation, of application Ser. No. 787,136, filed Oct. 15, 1985 now abandoned.

BACKGROUND

1. Field of the Invention

The present invention relates to fluidized bed apparatus for use in heat treating metal articles. More particularly it relates to a fluidized bed apparatus for use in the continuous heat treatment of elongated metal workpieces and especially of ferrous wires.

2. Background Art

Hitherto, in known fluidized beds for carrying out various thermal treatments on steel wires it has been difficult to maintain a stable bed fluidization, to keep the apparatus in a satisfactory condition for long operating periods and to run the thermal process reliably with minor production downtime owing to fluidization or mechanical troubles. These problems mostly stem from inadequate gas distribution devices, frequently from unsound combinations of structural materials (such as for example in fixing and joining metal and ceramic parts) and generally from unfavorable apparatus concepts comprising burners integrated in the fluidized bed apparatus enclosure. As a result, conventional fluidized bed plants are very often unwieldy constructions with little flexibility in exploitation, requiring much maintenance and tedious repair work. In addition, the continuous heat treatment of a plurality of identical wires in such plants frequently leads to excessive variations in product quality and to poor production economics.

OBJECTS AND SUMMARY OF THE INVENTION

One object of the present invention is to provide an improved fluidized bed apparatus which does not suffer from the above disadvantages.

Viewed from one aspect, the invention provides fluidized bed apparatus for use in heat treating metal articles, including a heat insulated structure enclosing an inner space, and a separate module disposed in said inner space, said module comprising a vessel adapted to receive particles to form the fluidized bed, a bottom plate of said vessel having a plurality of apertures arranged to uniformly distribute a fluidizing gas into said vessel, a gas plenum chamber adjacent said vessel bottom plate and a gas admission conduit in communication with said plenum chamber and arranged to receive fluidizing gas from an external source thereof, the fluidized bed module being made substantially of a metal alloy in the form of an integrated modular assembly being readily removable from said inner space and furnace structure and comprising a more reliable and easily adaptable fluidization system.

Thus a fluidized bed apparatus is provided of specific modular construction, which requires less maintenance, repair and start-up time and which is highly flexible in operation and exploitation. The fundamental improvements are surprisingly effective in enhancing apparatus and process reliability and in attaining an elevated productivity and better overall economics, particularly when continuously heat treating elongated metal articles. Indeed, the apparatus of this invention is very useful for continuously heat treating such elongated metal articles, such as, e.g., steel wires and the like, whereby the articles move in a line, preferably along straight and parallel paths through the fluidized particulate medium provided in the apparatus. The articles may then be subjected to a controlled heating, cooling or holding cycle and combinations thereof. Such treatments are commonly known as annealing, austenitizing, soaking, quenching, tempering, stress relieving, patenting and so on.

In a preferred embodiment, the fluidized bed apparatus or furnace with modular construction is characterised by an easy mechanical separation between the apparatus enclosure and the interior fluidized bed module and by the absence of burners in the apparatus and module, said distinct module being substantially made of metal. A suitable refractory metal alloy is chosen according to the working temperature of the fluidized bed. The apparatus may have a common steel-backed refractory enclosing, supporting and heat insulating outer structure, covered by a removable roof of similar materials forming an inner space or tunnel chamber of suitable form and dimensions in which one or more separate fluidized bed modules are disposed. Such a module is formed of an integrated metal assembly and comprises a U-shaped vessel containing inert particles to be fluidized, the bottom of which is engineered basically as a perforated or slitted plate to realize a uniform gas distribution into the particle vessel, and further and adjacent plenum chamber below said vessel fixed to the bottom thereof for admission of gas from an external generator. A gas admission conduit is fixed to the plenum bottom and is connected by means of a detachable flange to a main gas intake pipe passing through an opening in the apparatus outer structure for supplying a fluidizing gas from a gas make-up station (located ottside the apparatus) to the module gas plenum chamber.

The concept of the removable, separate module is very favourable in that it allows the module, which is preferably prefabricated, to be easily disposed in the inner tunnel space of the apparatus construction and to combine a plurality of such modules to any desired treatment length. It thereby largely prevents the occurrence of considerable thermal distortions and early mechanical damage which are inevitable in utilizing prior art constructions. Preferably, such a plurality of modules adjacent one another are provided, so as to form a fluidized bed treatment zone of any desired length or whereby said modules may be combined into two or more separate treatment zones, wherein each zone can be provided with an individual supply of fluidizing gas, so as to form a multizone fluidized bed apparatus with independent zone fluidization and related control.

In case of major apparatus problems, operational downtime is reduced because a module can readily be removed from the apparatus since it is not permanently fixed to it such as in prior art fluidized bed apparatuses where many interior components, including burners, are integrated in the refractory and supporting structure. The construction in accordance with the present invention is much more efficient with respect to inspection, maintenance and repair. If needed a defective module or part can be quickly replaced by another element.

In a preferred embodiment, a fluidized bed plant may be provided including one or more apparatuses in accordance with the invention, the apparatuses being joined together and/or being combined with other heat treatment equipment in a longitudinal direction to form an adaptable fluidized bed heat treatment plant, whereby said metal articles are displaced along substantially straight and parallel paths through said plants.

In a particularly advantageous embodiment the perforated bottom plate of the particle vessel is equipped with gas nozzles of specified design (each mounted in its respective plate aperture perpendicular to the horizontal bottom plate), thereby achieving and maintaining a uniform and stable particle fluidization with substantially constant bed height, even in fluctuating gas supply conditions. Preferably, said nozzle plate may be removed seperately from the module assembly.

Thus, according to another aspect of the invention, there is provided a nozzle for admitting fluidizing gas under pressure to a particle vessel of a fluidized bed apparatus, comprising a vertical inlet pipe of substantially constant bore adapted to be fixed in a perforated bottom plate of a said vessel, and a removable cap disposed on top of said pipe for deflecting fluidizing gas into the particle bed. The cap includes a vertically extending inner channel arranged in line with said vertical inlet pipe and has a flow constriction of appropriate dimension arranged to direct fluidizing gas at an even rate and required pressure into a laterally extending channel forming an outlet of the nozzle, said vertical inlet pipe and said cap being detachable from each other.

At least in preferred embodiments, the nozzle design is beneficial for controlling pressure drop (from plenum to fluidized bed chamber) and outflow velocity of the fluidizing gas. In addition it prevents nozzle clogging and undesirable wear of the distributor plate.

Important additional advantages of the nozzle plate of this invention have become apparent: defective nozzles or local unstable fluidization are readily remedied by replacing the easily accessible nozzle caps at required locations. Moreover, the adjustment of pressure drop/outflow velocity for a given fluidization job is simply carried out by exchanging the existing caps for a new set of desired constriction size. In the known gas distribution plates of fluidized bed furnaces, which are mainly perforated or slitted metal plates and also porous asbestos or ceramic sheets, there are always problems of aperture erosion and/or uneven gas flow rates, and such problems are solved by the preferred embodiment of the nozzle according to the invention.

Furthermore, the present nozzle is superior over prior art designs, including air distribution nozzle types, which more often suffer from poor accessability and flexibility in use or from a low service life. Hence the use of the novel nozzle type provides a stable fluidization (without piping or chimney effect) over the entire bed surface, ensures the maintenance of stability during long operating times with negligible components wear or damage and enables flow adjustment (local replacement of caps or complete exchange) to be carried out easily and with minimum plant shut-down.

The nozzles may be secured in corresponding plate apertures by a permanent weld joint or by securing means which enables the nozzle to extend to a variable height above the perforated bottom plate and to be detachable therefrom, such as for example, by a screw connection. Although just one nozzle outlet may be sufficient, preferably the laterally extending channel of the nozzle extends across the cap to form at least two such nozzle outlets. Furthermore, while the laterally extending channel may be oriented to have a vertical component, it preferably extends substantially horizontally (or with a small downward slope).

The heating and fluidization means for creating in the apparatus module a fluidized bed medium as desired may comprise any external gas generator or make-up station, such as, e.g., a combustion device, supplying a hot fluidizing gas mixture to the plenum chamber at the required temperature, flow rate and composition. This is regulatable according to burner setting and preferably should be adjusted automatically during processing, such as, e.g., by means of an appropriate bed control system, often in combination with auxiliary heat exchanging means located inside or outside the apparatus.

It is also possible to bring the particulate bed to the desired temperature by internal heating, for example by means of immersed electrical heating elements, or alternatively, when very high temperatures are needed, by burning inside the bed a suitable gas/air combustion mixture, admitted to the plenum of the fluidized bed module (preferably after previous mixing outside the apparatus) and blown under pressure into the particulate bed through the distributor nozzles. In any case the absence of individual burners in the fluidized bed enclosure or module (usually integrated in the plenum or in the roof of the particle vessel of conventional apparatuses) is an advantage of the preferred embodiments of the present invention.

Viewed from another aspect, the invention provides apparatus for use in heating metal articles to very high temperatures, typically above 900°–1000° C., including a distinct removable module of heat resistant metal, said module comprising a gas distributor plate provided with fluidizing nozzles as herinbefore defined, and a gas plenum chamber having a gas admission conduit in communication therewith, said apparatus further including a refractory chamber in which said module is disposed thereby forming a "U"-shaped particle vessel having fixed refractory walls and a base portion formed by said gas distributor plate of said module.

Preferably, the fluidizing gas is a mixture of combustion gas and air which is prepared outside the apparatus, flows to said gas plenum chamber and is blown at a regulatable rate and pressure through the particle bed by means of said fluidizing nozzles so as to fluidize and heat said bed, and the apparatus includes means for igniting said mixture to burn inside said bed.

BRIEF DESCRIPTION OF THE DRAWINGS

Certain embodiments of the invention will now be described, by way of example only, with reference to the accompanying drawings, in which.

DETAILED DESCRIPTION OF THE INVENTION

Figure 1A:
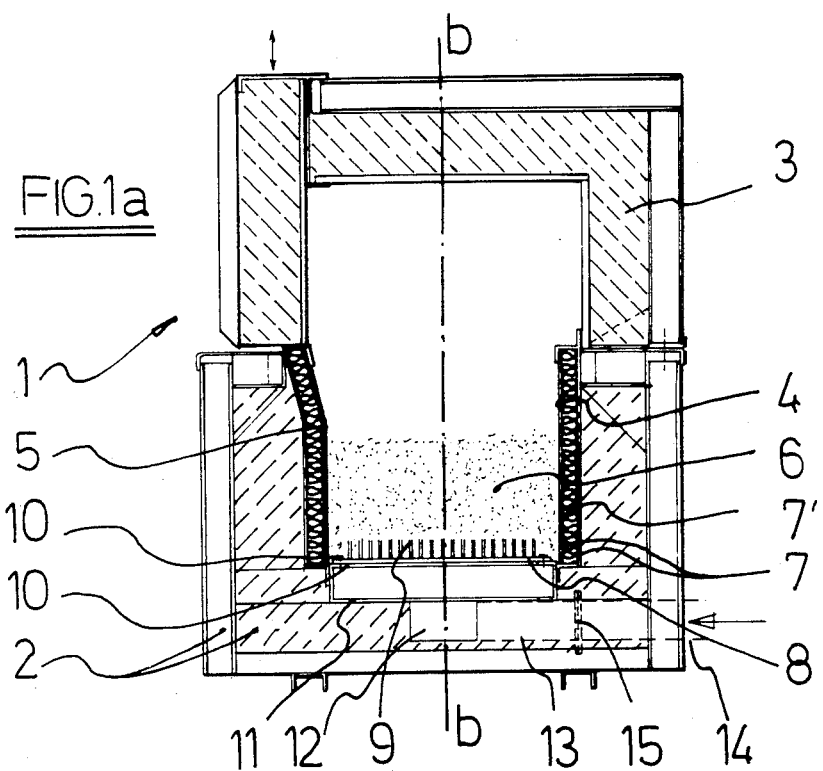
FIGS. 1a and 1b show cross-sectional views of a fluidized bed apparatus according to the invention.
Figure 1B:
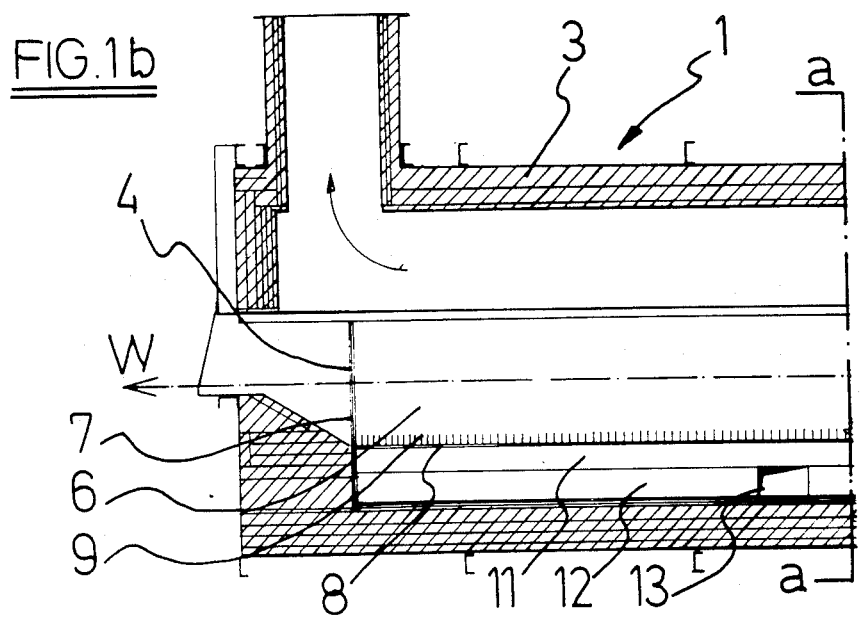

Referring to the drawings of FIG. 1, there is shown an example of a fluidized bed apparatus for continuously heat treating wire travelling in a longitudinal direction W through the apparatus. FIG. 1a is a vertical cross-section of a fluidized bed furnace 1 along line a-a perpendicular to the longitudinal apparatus direction W, as depicted in FIG. 1b. The peripheral wall and supporting structure 2 (made of steel and refractory material) forms a tunnel-like open processing compartment, covered by a removable heat insulating roof 3. A "U"-shaped compartment contains a distinct fluidized bed module 4 (or a number of said modules serially linked together), disposed on the apparatus base, and is separable from it. Module 4 comprises a vessel 5, containing in service a fluidized particle bed 6, the lateral shell of which preferably features a double wall 7 with fibrous insulation 7', a perforated distributor plate 8 with gas inlet nozzles 9 and an adjoining plenum chamber 11 having a gas admission conduit comprising a gas admittance duct 12 and a gas inlet pipe 13. The latter is connected to the main supply 14 of fluidizing gas by means of a detachable flange joint 15.

The gas distributor plate 8, seperating particle vessel 5 and adjacent plenum chamber 11, is linked to the vessel bottom and plenum upper surface 10, preferably by a disconnectable bolt joint 10'.

Figure 3A:
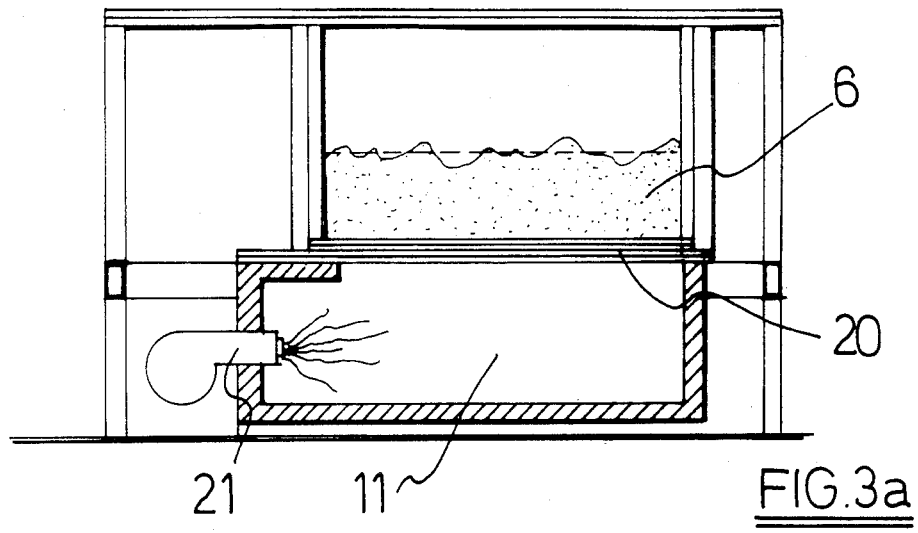
FIGS. 3a and 3b show two typical examples of prior art fluidized bed apparatuses.
Figure 3B:
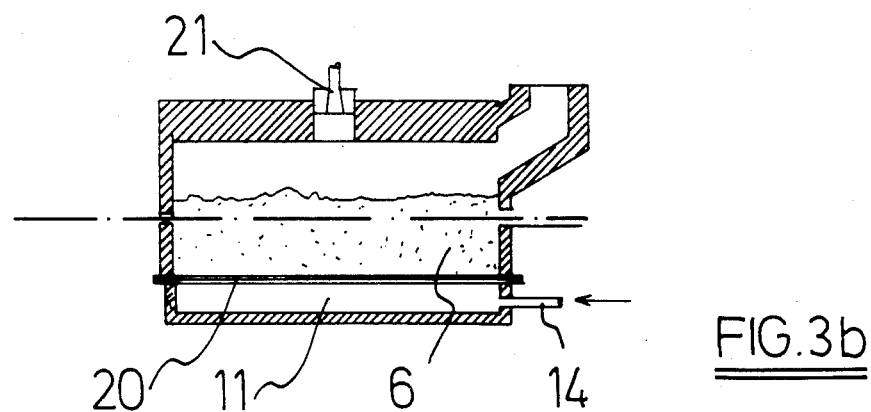
Figure 3C:
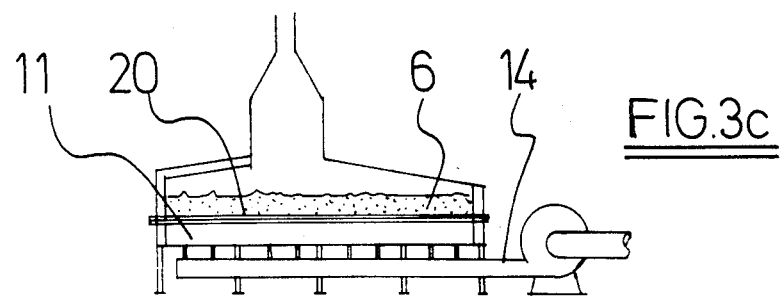

As can be seen from FIG. 1, module parts 5 to 13 constitute a one-piece coherent metal structure, preassembled from single elements of heat resisting steel or alloys so as to form a distinct module 4 of suitable shape and dimensions which fits into the apparatus enclosure and which can be easily removed from it after lifting heat insulating roof 3 and detaching flange joint 15. If necessary plate 8 (containing nozzles 9) or portions of it can be disconnected separately from module 4, e.g. for the purpose of quick nozzle repair or readjustment, this being an important aspect of the apparatus. By contrast, in all prior art cases the plenum, distributor plate and/or particle container are integrated in the apparatus (refractory) construction and are substantially inseparable from the main frame because of the apparatus design or due to the presence of several fixed refractory/metal connections. Prior art fluidized bed furnaces are exemplified in FIG. 3. Referring to FIG. 3a, there is shown a conventional apparatus with a burner 21 incorporated in a fixed plenum 11. FIG. 3b gives an example of a fluidized bed with burner 21 heating from above, and in FIG. 3c a conventional installation is shown equipped with a separate hot gas supply. Besides their integrated rigid design, such prior art apparatus nearly always display sheet or plate (asbestos sheets, slitted steel plate and combinations thereof) gas distributors 20 which are permanently fixed in the refractory walls between particle vessel and plenum.

The benefits obtained by the novel apparatus construction as exemplified by the referred embodiments of the invention are numerous and more important than expected at first sight in comparison to the prior art fluidized beds illustrated in FIG. 3. The basic advantages of a one-piece modular containment with respect to constructional simplicity and ease of mounting, replacement, maintenance and repair are clear. Moreover, this special modular construction allows easy adaption of processing length and if desired the establishment of different treatment zones in one furnace enclosure.

Compared to prior art fluidized beds, considerable additional advantages are provided by the design and construction of the preferred apparatus. These reside not only in the absence of burners in the plenum and in the avoidance of direct exposure of components to combustion flame heat, but also in the fact that now a continuous interior metal encasement is formed from gas inlet to bed exit.

As a result, all critical apparatus parts are essentially free from dissimilar material joints, and when exposed to fluctuating heat conditions, they behave in the same reliable way. There is thus less risk of serious thermal mechanical distortions and of premature apparatus damage. Also, gas leakage is greatly avoided because of the entirely metallic one-piece containment, and in particular because of the absence of dissimilar joints sensitive to differential thermal expansion and damage inducing stresses, which is a frequently encountered drawback in prior art rigid metal/refractory designs.

Figure 2A:
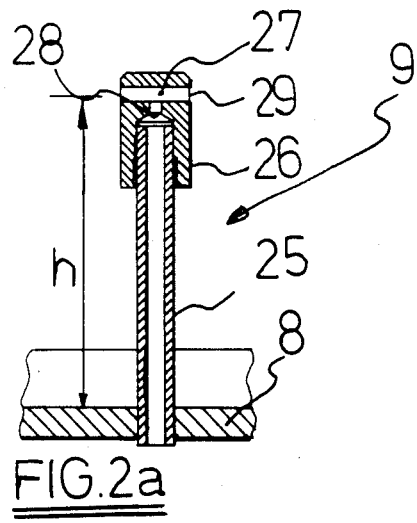
FIG. 2 illustrates a gas nozzle design according to the invention and the placing thereof in a fluidized bed apparatus.

To accomodate excessive thermal expansion of the module assembly, its peripheral metal shell (7) may contain a number of corrugations or may feature zig-zag shaped wall parts. In this way major mechanical distortions of module components or of the assembly (squeezed against the apparatus enclosure) are greatly eliminated, even after severe thermal cycling. A second major aspect of the present invention is the new nozzle type, an embodiment of which is illustrated in FIG. 2a. The nozzle comprises a gas inlet pipe 25 of substantially constant bore, and projects vertically from distributor plate 8 to a variable height h. It is fixed into each plate aperture by suitable means, for example by a permanent weld joint or by a detachable screw connection, and is characterized in that it possesses a disconnectable nozzle cap 26 of specific design featuring a T-shaped inner gas channel 27, of which the vertical entry bore (being in a direct line with the tubular passage of pipe 25) has a narrowing 28 in the form of a half-venturi, which flows into the horizontal wider part of said channel with lateral discharge exits 29.

Figure 2B:
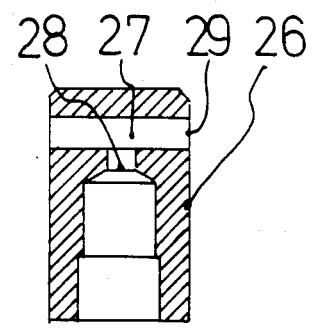
Figure 2C:
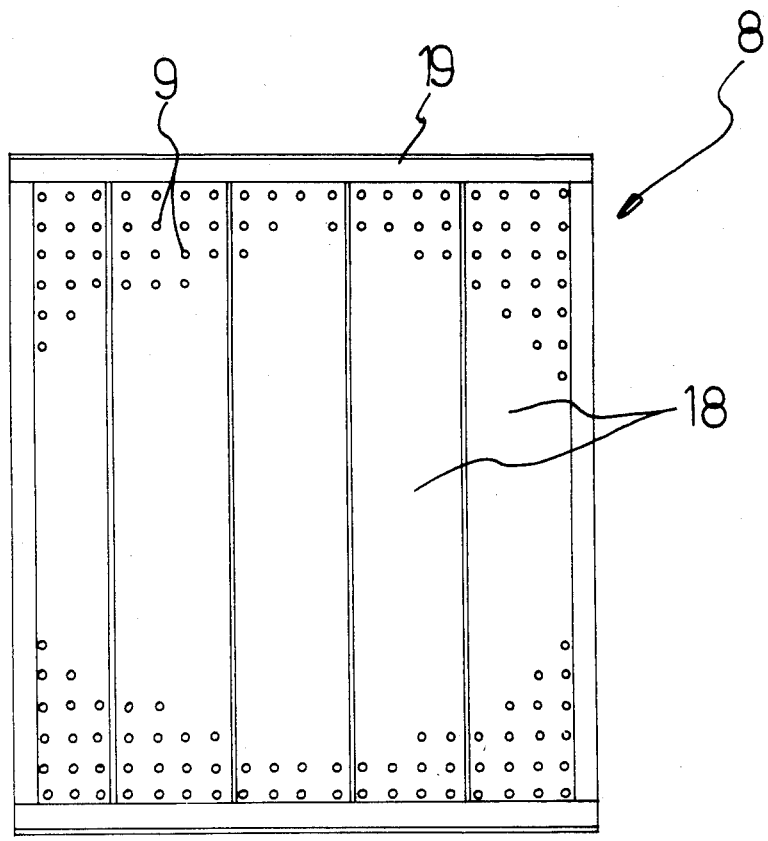

FIG. 2b gives a more detailed view of nozzle cap 26 and FIG. 2c shows an example of how a perforated gas admittance plate 8 is equipped with a regular pattern of gas distribution nozzles 9 and how said plate may be composed of plural detachable sections 18 mounted in a frame 19, which is fixed between particle vessel bottoms and plenum upper surface.

The nozzle has many beneficial properties. First, it is clear that prior art problems related to nozzle blockage, plate wear and aperture growth by particles and also to undesirable particle loss from bed to plenum are judiciously solved. Previously, distributor plates have comprised porous ceramic bottoms, multiple asbestos sheets, perforated or slitted metal plates with a large number of small apertures and/or simple inlet pipes related to average particle size. These have persistent problems due to abrasive wear and the increasing amount of particle dust in the course of processing. The novel nozzle concept further enables the necessary number of gas inlet apertures to be decreased considerably, because the required relationship (for sufficient, uniform fluidization) between particle diameter and aperture size can be abandoned. The improved fluidization stability during operation is still another advantage of the preferred nozzle construction: each nozzle remains equally active, maintains consistent fluidizing conditions over a long time, and the nozzle half-venturi of adjustable constriction size makes pressure drop regulation and maintenance of the required gas velocity range a lot easier. A most important additional benefit is that the nozzle caps can be readily replaced, for example, in case of local bed unstabilities, incidental nozzle defects, or when other fluidization conditions are desired - by new caps or a new set of caps of more appropriate constriction size, and this with a minimum installation down-time. As a result, bed fluidization is much less sensitive to fluctuating gas admittance conditions in comparison to prior art fluidization systems where "geysering" (peaks and valleys on the bed surface) and differences in particulate density over the bed volume are difficult to overcome.

Still another unexpected attractive aspect of the preferred embodiments of the present invention is that the novel distributor plate/nozzle construction gives the possibility of creating a static particle bed of adaptable thickness on the vessel bottom plate. As a consequence erosive and abrasive wear of the container bottom, distributor plate and nozzle parts by sand particles is greatly reduced. In addition, a thermal insulation blanket can thus be formed retaining the fluidized bed heat and protecting the plate bottom.

Moreover, what is even more important for fluidized beds with internal in situ combustion heating, the apparatus enables the establishment of a static bed of sufficient insulating thickness, by which it now becomes technically possible to raise the particle bed temperature to high levels (largely above 700°-800° C.) which normally cannot be tolerated by metallic distributor systems and for which purpose porous ceramic plates and/or special local cooling arrangements are mandatory. From this it is apparent that the inventive concept as exemplified by the preferred apparatus described herein has considerably wider prospects than conventional fluidized bed technology and process applications which are related mainly (but not only) to metallurgical heat treatments. In particular, the improved fluidized apparatus in accordance with the present invention can be operated with very hot, usually internally fired, fluidized particulate beds while still retaining most of the important advantages inherent in the modular construction and nozzle design as described above.

The invention will now be illustrated by two examples. A first example relates to an embodiment for use in metallurgical patenting and a second one to a fluidized bed heating furnace allowing very high temperatures to be attained.

EXAMPLE 1

Steel wires of 0.80% C steel with a diameter of 2 mm and 1.15 mm were austenitized in a gas fired conventional heating furnace and subsequently treated in a fluidized bed apparatus comprising tow sections: a quenching zone of 2 m length kept at a bed temperature of 480° C. and a soaking (transformation) zone of 4.5 m kept at a temperature of 555° C.

In case A a conventional fluidized bed construction with a perforated metallic distributor plate was used and in case B the modular construction and special gas nozzles were applied.

Fluidizing gas volume and pressure were regulated so as to obtain a gas velocity of 10-11 cm per second. The average sand particle size was 0.27 mm.

Case A : After two weeks of operation considerable fluidization troubles began to emerge which were mainly related to irregular bed levels, excessive turbulence and gradual increase of particle loss. In spite of all trials it was impossible to stabilize the particle bed in a reliable way. After inspection it appeared that the bottom plate was markedly worn and that several of the slitted apertures were severely abraded and had increaded in size.

In a second trial the metallic distributor plate of case A was replaced by a layer of (porous) asbestos sheets, fixed and sustained on a metallic grid. Major apparatus disturbances and fluidization difficulties were not experienced for a few weeks, but afterwards minor bed surface irregularities appeared and multiplied steadily ro reach a situation in which at some places of the asbestos blanket the flow of gas clearly became uneven, varying from choking to piping effects. As a result, some wires locally emerged from the fluidized bed and particle loss became critical.

Case B: Fluidized bed apparatus zones provided with gas and particulate containment module as depicted in FIG. 1. The bottom plate was equipped with a regular pattern of nozzles (as represented in FIG. 2) of roughly 5 cm height and spacing. Fluidization results were excellent. Bed stability, re-start and holding posed no problems. Particulate overflow was minimal and component damage or distortion negligible.

In addition to operating reliability, the influence of fluidized bed apparatus type on patented wire strength and waste (rejected wire) has been determined. The results are presented below for a conventional bed furnace (A), and for an improved fluidized bed apparatus of this invention (B) used in patenting 0.80% C steel wires of 2 mm and 1.15 mm diameters.

TABLE 1

| Apparratus type | Fluidized bed patenting results | | | | | |
|---|---|---|---|---|---|---|
| | Average wire tensile strength N/mm² | | % wires out of optimum tensile range | | average scrapped (+) wire ratio (%) | |
| | d = 2 mm | d = 1.15 mm | d = 2 mm | d = 1.15 mm | d = 2 mm | d = 1.15 mm |
| A | 1282 | 1324 | 1-5 | 3-8 | 2.5 | 6 |
| B | 1295 | 1317 | 1 | 1 | 1 | 1 |

(+) sum of rejected patented semi-product (wire not meeting required specifications + normal processing waste) and subsequently experienced wire drawing losses.

For both investigated wire diameters it was observed that the quality of the wires treated in a fluidized bed apparatus in accordance with the present invention is more consistent. The wires' microstructure was also substantially free of local hard spots (mainly bainite) which is a persistent problem in prior art fluidized bed patenting due to accidental unstable fluidization and imcomplete wire immersion in conventional fluidized bed furnaces.

EXAMPLE 2

Figure 4A:
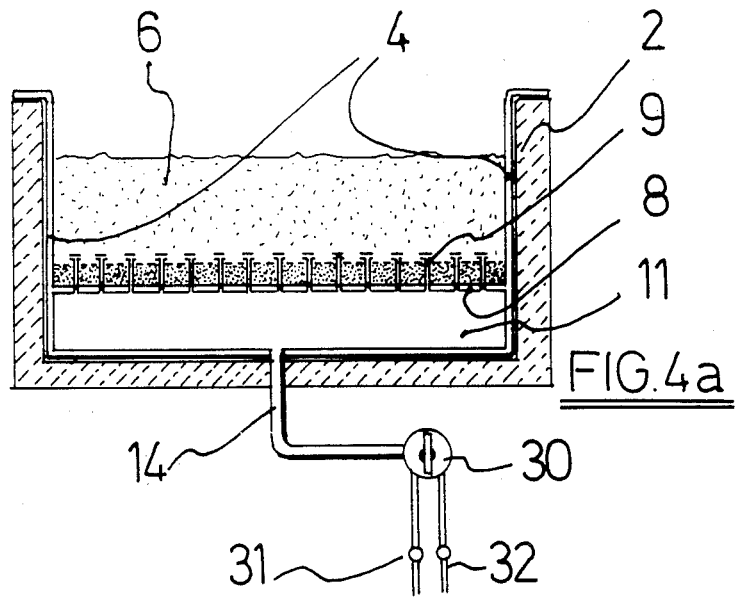
FIG. 4 shows an embodiment of a fluidized bed apparatus with internal bed heating by in situ combustion.

In this example (illustated in FIG. 4) the applicability of the novel distributor/nozzle design to high-temperature internal bed heating was investigated. For this purpose distributors made of porous ceramic materials are normally used. These components are expensive and fairly prone to sudden cracking and to fluidization instabilities as a result of irregular wear and incidental clogging of the fine apertures in the ceramic plate.

A fluidized bed container equipped with a distributor bottom plate and with nozzles made of a heat resisting 25Cr-20Ni steel was used.

The nozzles were designed in accordance with the present invention and preferably extended at least 6 cm above the horizontal plane of the container bottom plate. Through the nozzles a gaseous combustion mixture of natural gas and air, preferably a stoechiometric mixture, was passed, previously mixed outside the apparatus and piped to a plenum chamber from where it was blown through the fluidizing nozzles.

After ignition of the particulate bed it was observed that regime heating to a temperature above 1000° C. was established within a short time, the combustion front remaining at a safe distance above the nozzle caps. It was also observed that the nozzles were not burnt, even after increasing the bed temperature up to 1100° C. It was further apparent that a static particulate bed (numeral 6 in FIGS. 4a and 4b) of sufficient thickness was formed, covering the bottom plate and acting as an insulating blanket, whereby said plate was protected from overheating. Moreover, the risk of a gas explosion in the plenum was eliminated.

This embodiment is illustrated in FIG. 4, showing a fluidized bed furnace, comprising a particle container (which may have a ceramic wall lining or a shell of heat resistant metal), a gas distributor bottom plate 8 with nozzles 9 and a gas plenum 11 below said distributor (all made of suitable heat resistant metal parts) and a supply 14 of pressurized air 31 and gas 32, premixed outside the heating module in a mixing device 30. Heating power is regulated by adjusting the flow rate of the admitted combustion mixture.

Figure 4B:
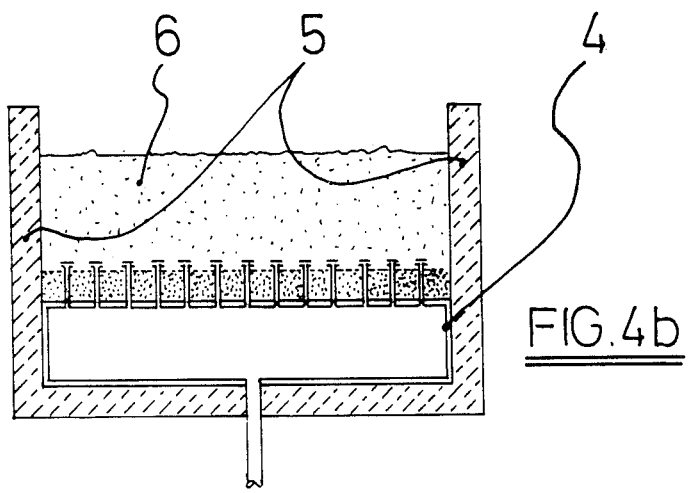

The fluidized bed high temperature furnace can be entirely of modular construction (cf. FIG. 4a) with particle vessel, distributor plate with nozzles and gas plenum integrated into one module of heat resisting metal distinct from the outer furnace structure, or also a partly modular design (FIG. 4b). In the latter case a refractory ceramic container 5' (compatible with the high-temperature heating environment) is combined with an adjoining plenum/distributor plate/nozzle assembly of heat resistant metal.

Thus, according to a preferred embodiment of the present invention the fluidized bed "high"-temperature furnace is entirely of modular design with particle vessel, distributor plate, fluidizing nozzles and gas plenum integrated in one prefabricated assembly of heat resisting metal, whereby the particle container shell exposed to the highest temperatures may be made of a different, more heat resistant alloy type as compared to the other module components (or may have a ceramic cladding on the interior shell). Such a furnace avoids the use of fragile ceramic gas distribution plates as used in the prior art.

Alternatively, the high-temperature furnace may be of partly modular construction, comprising a distinct coherent metal assembly incorporating a distributor plate, nozzles, gas plenum and admittance duct, whereby said module assembly (forming the bottom part of the particle containment) is disposed in a refractory chamber of which the upper part of the fixed refractory walls forms a proper containment for the very hot fluidized particles.

I claim:

1. Fluidized bed apparatus for use in heat treating metal articles at high temperature, comprising:
    (a) at least one distinct removable module adapted to receive particles to form the fluidized bed, the module being in the form of a substantially integrated assembly of heat resistant metal alloy comprising:
        (1) a gas distributing bottom plate formed of at least one adjoining separately removable element, each element having a plurality of nozzles being detachable from said plate and having a variable cap length and securing means for extending the height at which gas flows out thereof;
        (2) an adjoining gas plenum chamber having a gas admission conduit in communication therewith arranged to receive a combustible fluidized gas from a source thereof, the gas admission conduit being connected to a lower region of the plenum chamber and detachably connected by means of a flange joint at an upstream end to a main gas entry pipe by disconnection of connections therebetween, including the disconnection of the flanged joint;
    (b) a heat insulating outer furnace structure enclosing a tunnel-like inner space comprising:
        (1) refractory walls and a separable base portion formed by said gas distribution plate of said module;
        (2) a removable heat insulating cover; and wherein, the fluidized gas is a mixture of combustion gas and air prepared outside the apparatus and is blown at a regulatable rate and pressure through said particle bed by means of said fluidizing nozzles, so as to fluidize and heat the bed by burning said mixture inside said bed, and wherein the apparatus further includes means for igniting said mixture to burn inside said bed.

2. The apparatus of claim 1 wherein the module comprises a prefabricated all-metallic assembly for receiving particles to form the fluidized bed and having means to control excessive thermal expansion and related distortion of said module.

3. Apparatus as defined in claim 1 for use in the continuous heat treatment of elongated workpieces such as metal wires, including a plurality of said modules adjacent one another so as to form a fluidized bed treatment zone of desired length and whereby said modules are combined into at least two separate treatment zones, wherein each zone is provided with an individual supply of fluidizing gas, so as to form a multi-zone fluidized bed apparatus with independent zone fluidization and related control.

4. A fluidized bed plant for use in continuously heat treating a plurality of elongated metal articles including wire materials, comprising: at least one apparatus as defined in claim 1, the apparatus being combined with other heat treatment equipment in a longitudinal direction to form an adaptable fluidized bed heat treatment line, whereby the metal articles are displaced along substantially straight and parallel paths through said plant and subjected therein to a prescribed heat treatment cycle.

5. Apparatus for continuously heat treating steel wires, comprising a multi-zone fluidized bed apparatus as defined in claim 3 and including separate quench and soaking zones each provided with an individual supply of fluidizing gas and with independent bed temperature control, thereby enabling a controlled cooling and holding treatment of previously furnace heated steel wires.

6. Apparatus as defined in claim 1 for use in continuously heating a plurality of metal wires, whereby said wires are arranged to travel along substantially straight and parallel paths through the apparatus.

7. Apparatus according to claim 1 for use in continuous high-temperature heating of metal wires including high-rate austenitizing of steel wires, whereby said apparatus has an entry and exit gate and conveying means arranged to transport the wires along substantially straight and parallel paths through said fluidized bed furnace apparatus.

8. Apparatus as defined in claim 2 wherein said controlling means includes thermal expansion ribs.

9. Apparatus as defined in claim 2 wherein said controlling means includes a corrugated vessel shell.

10. Apparatus as defined in claim 2 wherein said controlling means includes a zig-zag shaped vessel shell.

* * * * *